June 10, 1958   J. F. HEWITT   2,838,162
MACHINE FOR PROOFING DOUGHNUTS
Filed Oct. 20, 1953   7 Sheets-Sheet 2
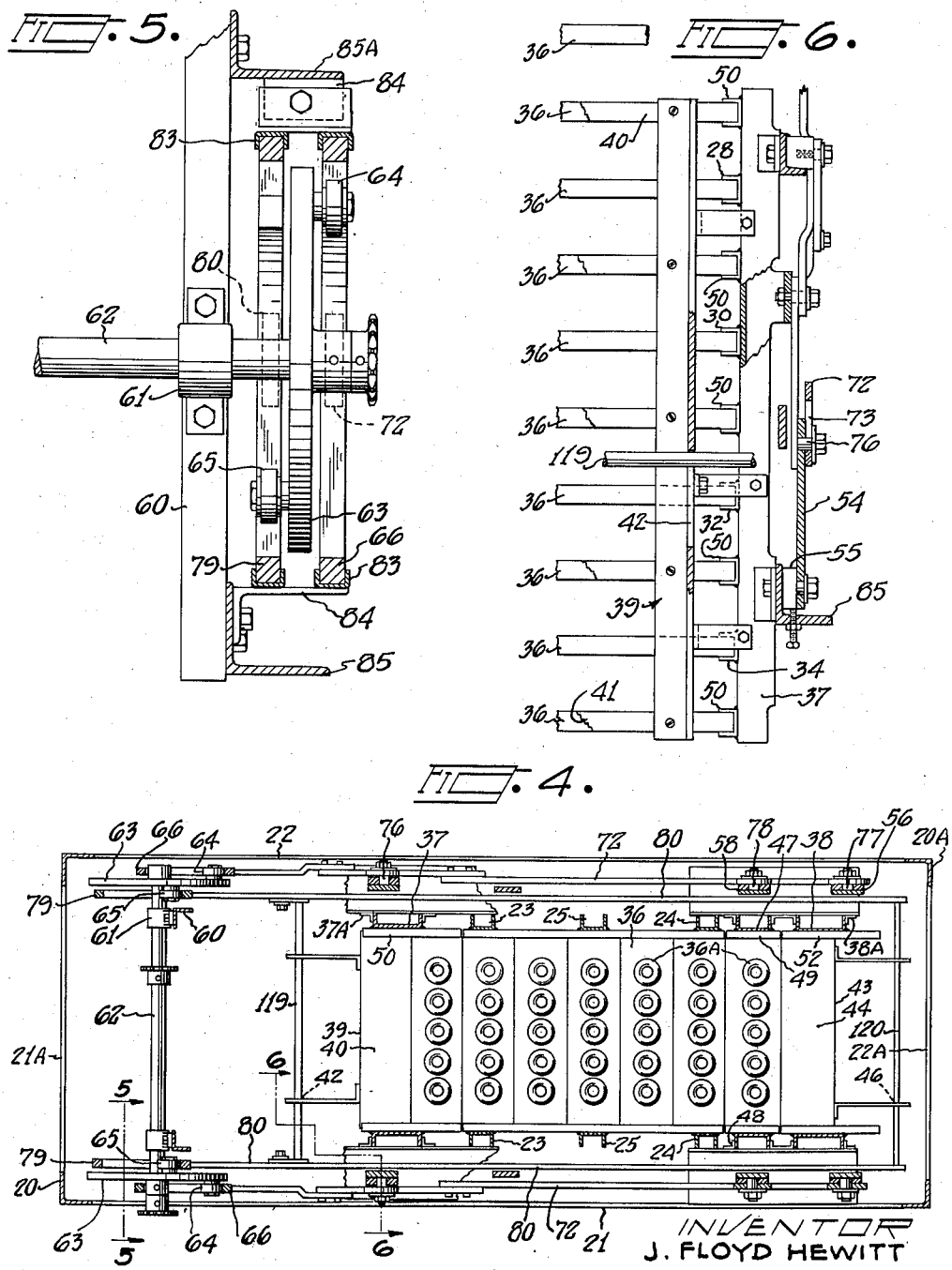

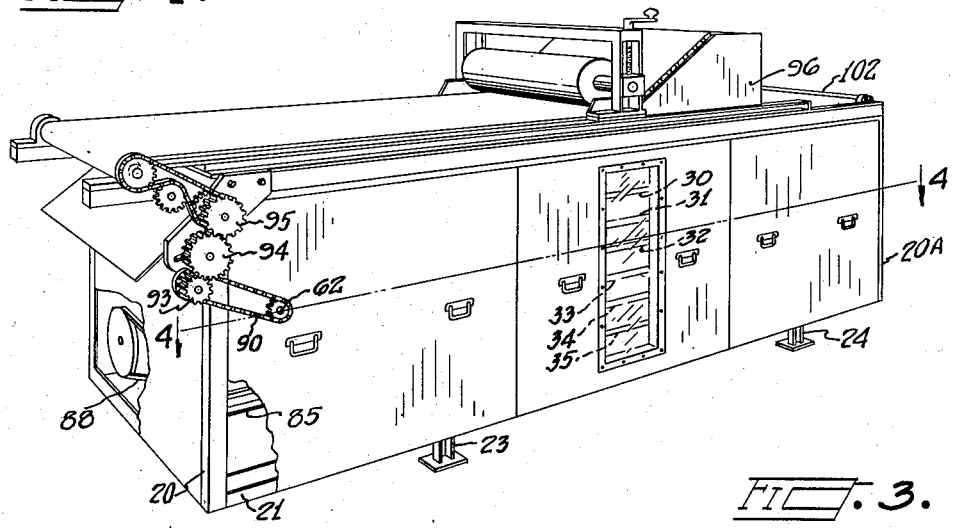
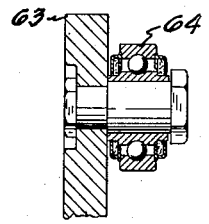
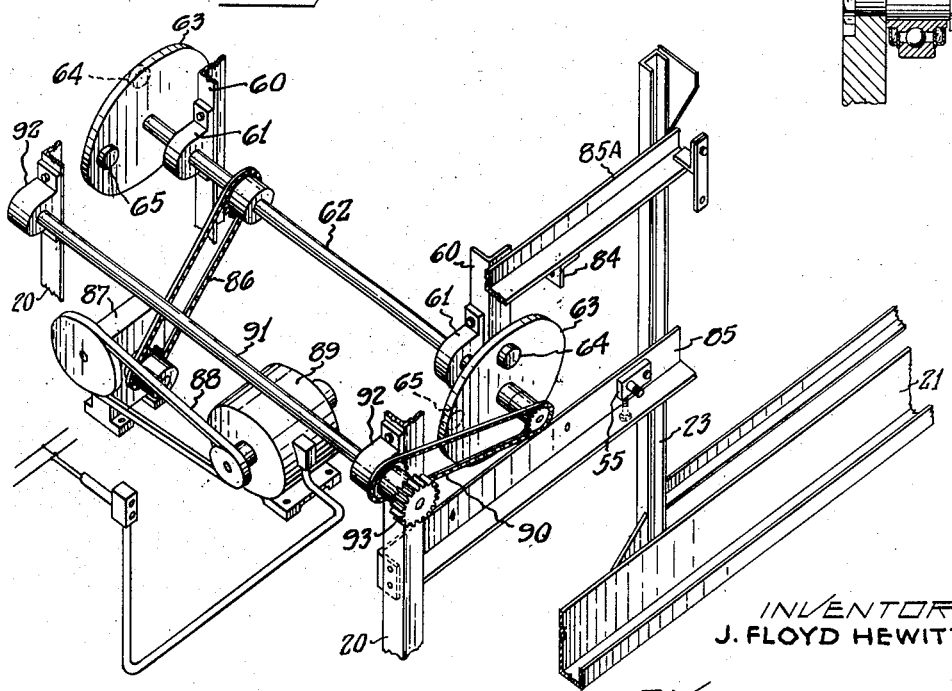
INVENTOR
J. FLOYD HEWITT
ATTORNEY

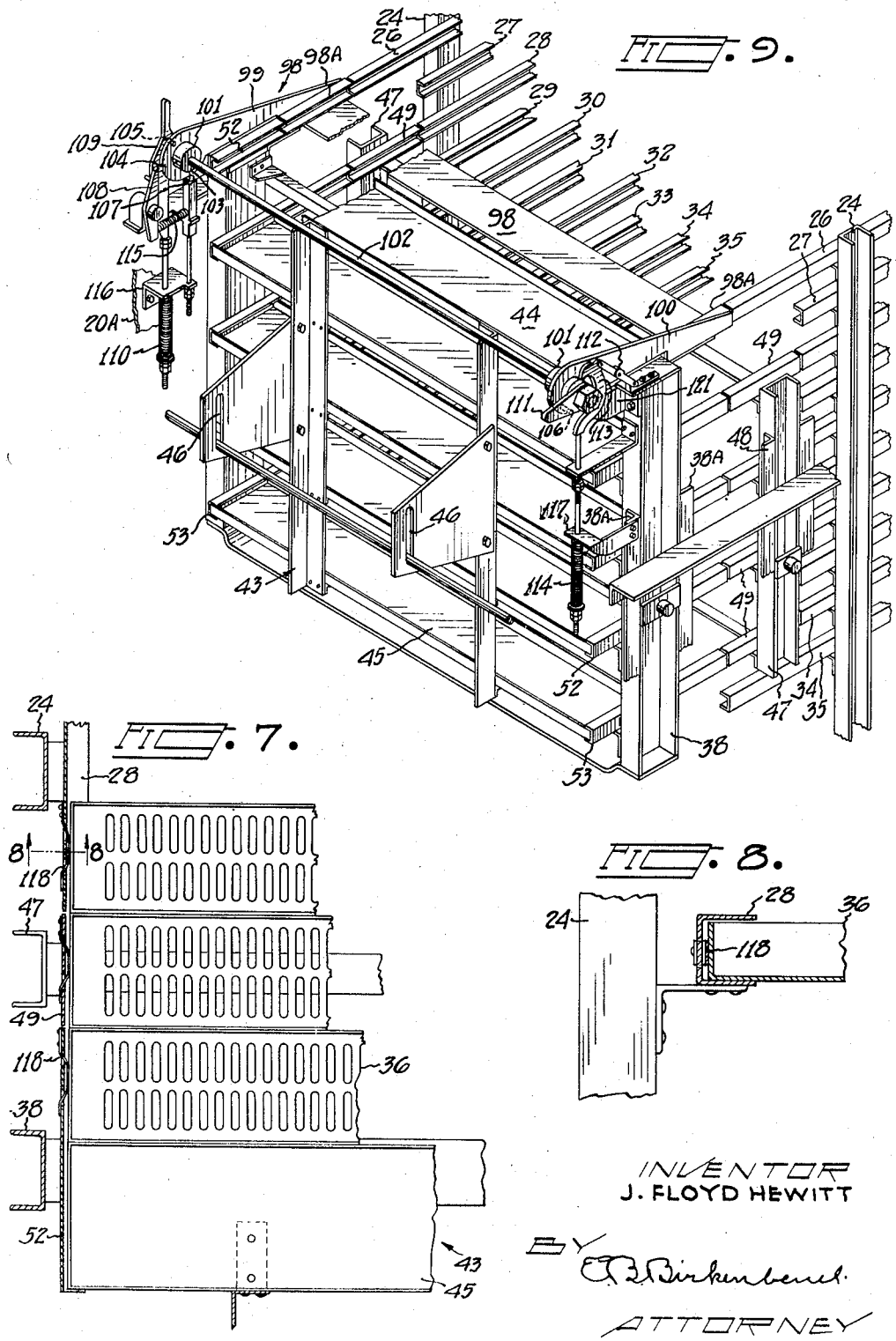

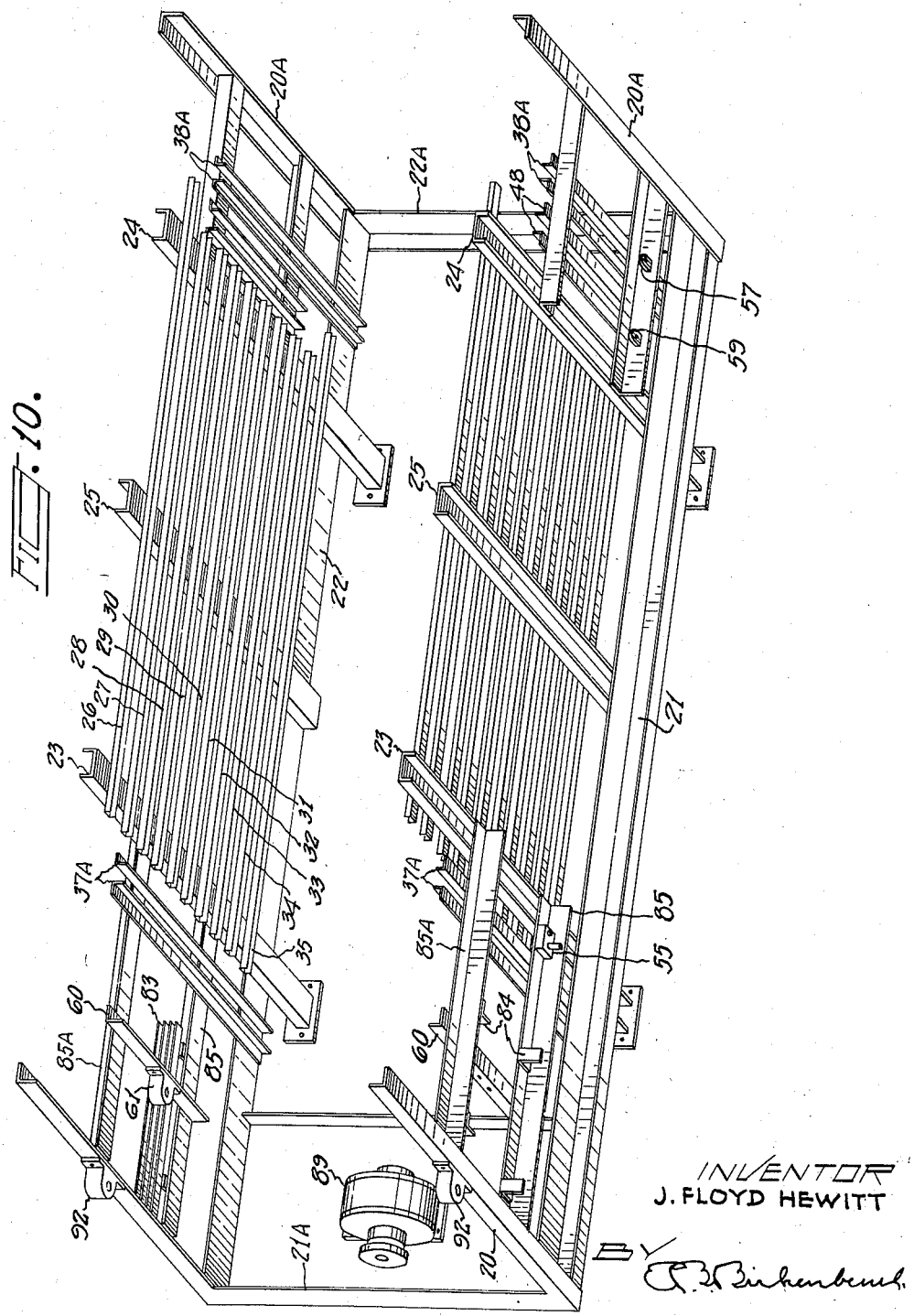

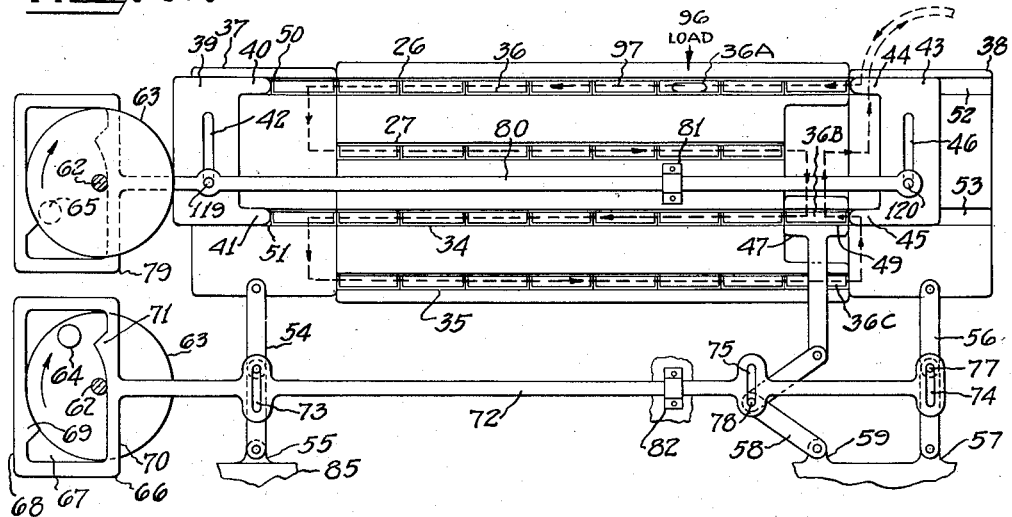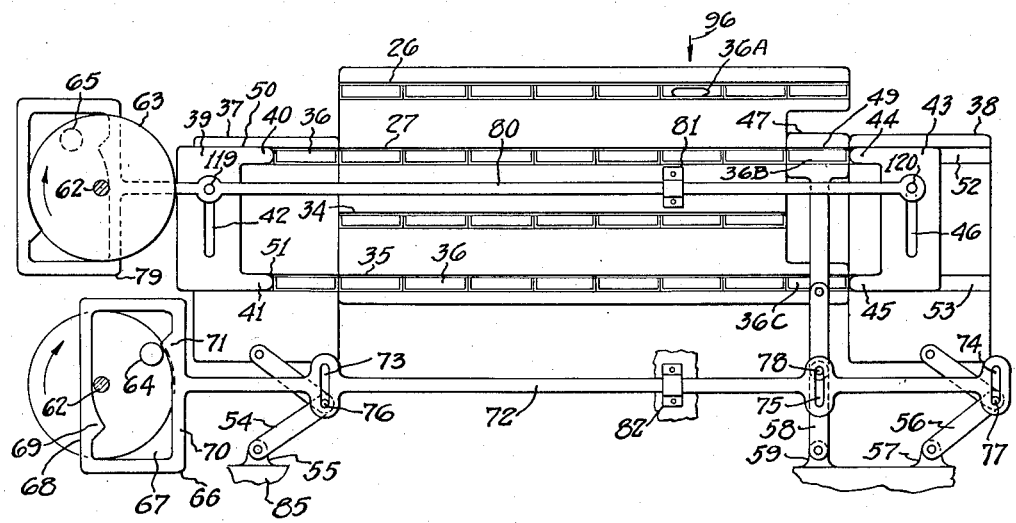

June 10, 1958  J. F. HEWITT  2,838,162
MACHINE FOR PROOFING DOUGHNUTS
Filed Oct. 20, 1953  7 Sheets-Sheet 6

INVENTOR
J. FLOYD HEWITT

ATTORNEY

June 10, 1958 J. F. HEWITT 2,838,162
MACHINE FOR PROOFING DOUGHNUTS
Filed Oct. 20, 1953 7 Sheets-Sheet 7
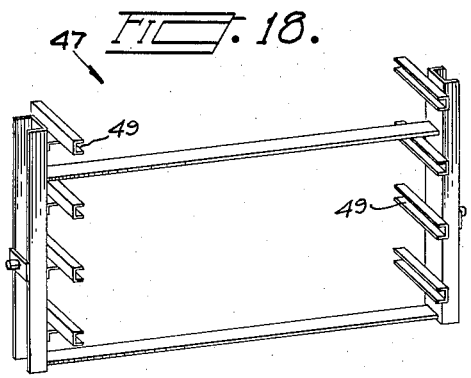
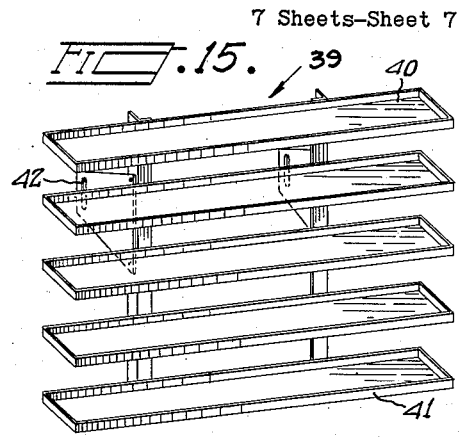
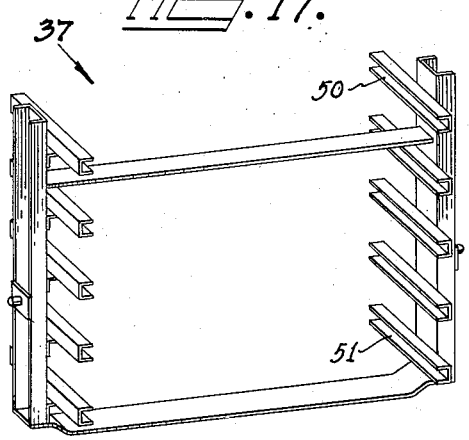
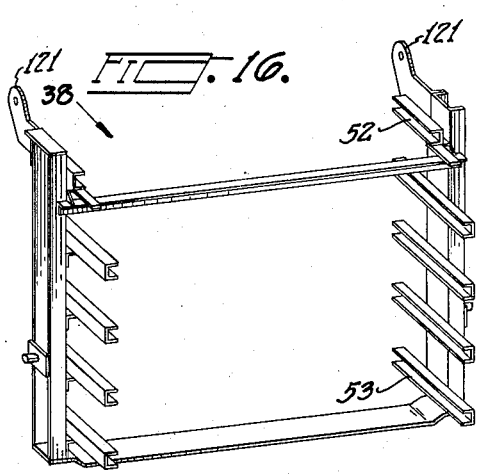
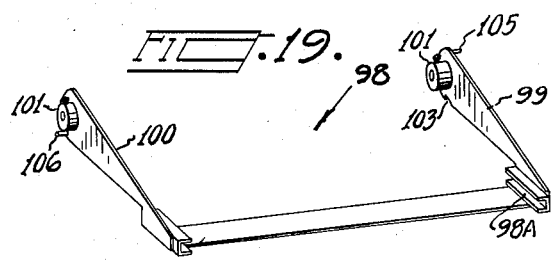
INVENTOR
J. FLOYD HEWITT
BY
ATTORNEY United States Patent Office 2,838,162
Patented June 10, 1958

2,838,162

MACHINE FOR PROOFING DOUGHNUTS

John Floyd Hewitt, Portland, Oreg.

Application October 20, 1953, Serial No. 387,167

2 Claims. (Cl. 198—84)

This invention relates generally to the bakers art and specifically to a machine for proofing doughnuts and method of using same.

The main object of this invention is to provide a relatively simple machine for accurately proofing a continuous flow of doughnuts a predetermined length of time.

The second object is to so construct the machine that the proofing action may be carried on in a relatively small space.

The third object is to so proof the doughnuts that the temperature of the proofed doughnuts may be more easily controlled and the doughnuts being proofed may be better protected against contamination with dust and other airborne foreign substances and odors.

The fourth object is to entirely eliminate all long conveyors such as are commonly employed in proofing machines, thereby avoiding much expense and time in manufacture as well as cutting down the power requirements.

The fifth object is to overcome the objection of conveyors which must be lubricated and gradually pick up flour dust from the air.

I accomplish these and other objects in the manner set forth in the following specification as illustrated in the accompanying drawings, in which Fig. 1 is a perspective view of the entire machine with parts of the casing broken away.

Fig. 2 is a fragmentary perspective of the main drive.

Fig. 3 is a section taken along the line 3—3 in Fig. 1.

Fig. 4 is a section taken along the line 4—4 in Fig. 1.

Fig. 5 is a section through the drive disks taken along the line 5—5 in Fig. 4.

Fig. 6 is a section taken along the line 6—6 in Fig. 4.

Fig. 7 is a fragmentary section in plan showing the tray holding spring.

Fig. 8 is a section taken along the line 8—8 in Fig. 7.

Fig. 9 is a fragmentary perspective view showing parts of the unloader.

Fig. 10 is a perspective view of the main frame stripped of all moving parts in order to correlate the various views.

Fig. 11 is a somewhat distorted side elevation in which the actuating disk is shown in duplicate to facilitate the description of its operation and showing a condition in which a minimum number of channels are illustrated, showing the first and second carrier raised and the third carrier lowered while the first pusher is retracted and the second pusher has moved the trays in alternate channels in the same direction.

Fig. 12 is similar to Fig. 11 but shows the first and second carriers lowered, the third carrier raised but the pusher horizontal position unchanged.

Figure 13:
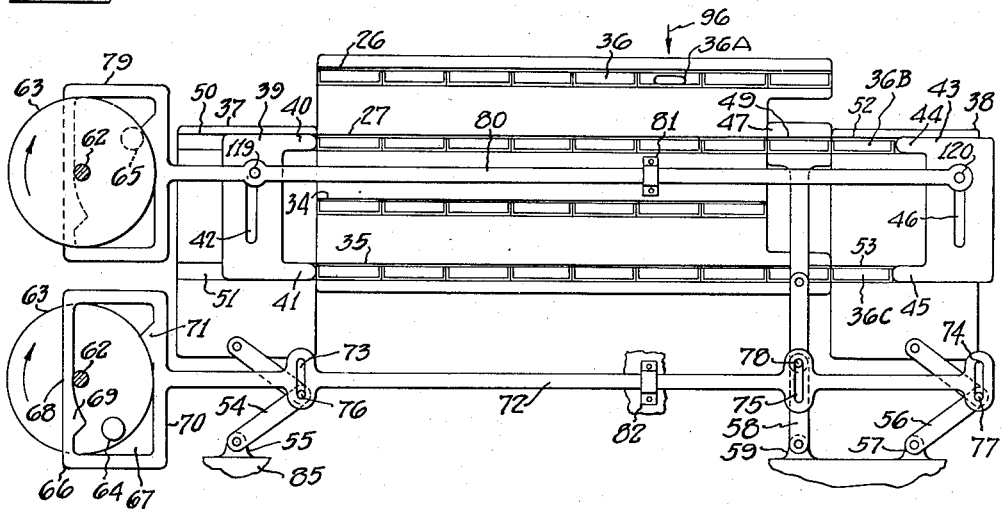

Fig. 13 is a similar view to Fig. 12 except that all the pusher positions are unchanged and the pushers have moved the trays through the intermediate channels in a direction opposite to that imparted in Fig. 11.

Figure 14:
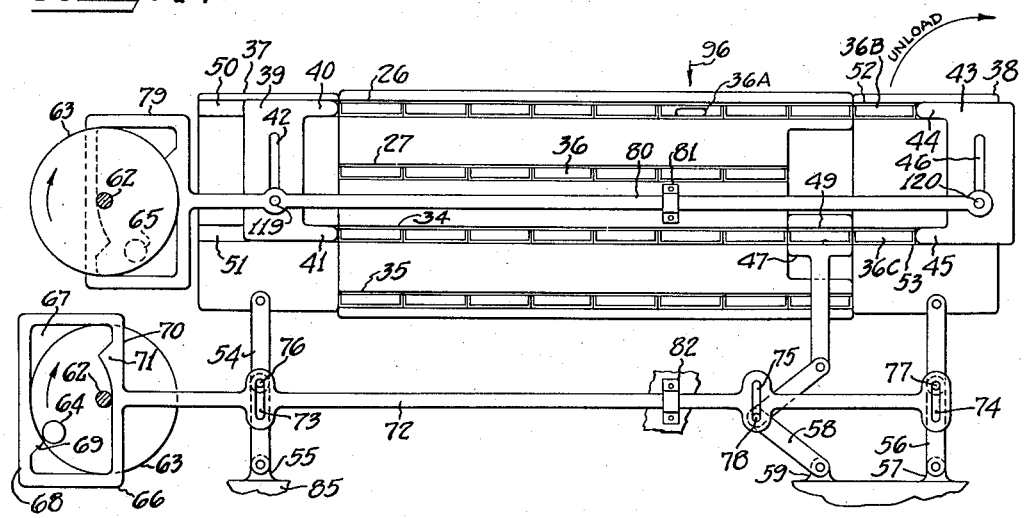

Fig. 14 is also a similar view but showing the first and second carriers raised and the third carrier lowered.

Fig. 15 is a perspective view of a pusher element.

Fig. 16 is a perspective view of the unloading end of the elevator.

Fig. 17 is a perspective view of the drive end elevator near the unloading end.

Fig. 18 is a perspective view of the intermediate carrier.

Fig. 19 is a perspective view of the unloader element.

Like numbers of reference refer to the same or similar parts throughout the several views.

Referring in detail to the drawings, it must be understood that the duration of the proofing can be varied by providing more or less guide channels, and that all accessories, such as leaders, dough forming and cutting and adjustments and counterweights for some parts have been omitted from the drawings as their use is well understood and they form no part of the present invention.

In Fig. 10 the main frame is illustrated, stripped of all moving parts. At the motor end are located the vertical corner posts 20, and the posts 20–A form vertical corner members at the end opposite the motor end. The lower ends of the posts 20 and 20–A are joined longitudinally by the ties 21 and 22 and transversely by the tie bars 21–A and 22–A. Upright channel posts 23 and 24 are attached to the ties 21 and 22, and are secured to the foundation (not shown). The intermediate posts 25, as well as all other parts, are supported by the ties 21 and 22.

Secured to the inner sides of the posts 23, 24 and 25 are the guide channels 26 to 35 forming tracks in which are slidably supported the elongated trays 36 as illustrated in Figs. 7 and 8. The trays carry the formed pieces of dough 36–A which are to be proofed.

The posts 20 and 23 are joined by a lower longitudinal tie 85 and upper tie 85–A. Spaced from the posts 20 are vertical bars 60. One set of channel guides 83 and the motor 89 are shown to correlate this portion of the main frame with Figs. 2 and 5.

Vertical guide bars 37–A spaced from the post 23 indicate the location of first carrier 37 which is illustrated in detail in Fig. 17 and diagrammatically shown in Figs. 11 to 14.

The corner posts 20–A and the channel posts 24 are joined by horizontal ties, the lower of which carries the toggle supports 57 and 59. Vertical bars 38–A act as guides for the carrier 38 shown in detail in Fig. 16. Spaced from the posts 24 and guides 38–A are guides 48 within which the third carrier 47 (Fig. 18) is slidably mounted. Figs. 7 and 9 illustrate in detail the relation between these parts as well as the pusher unit 39 (Fig. 15) and the unloading device, a portion of which is shown in detail in Fig. 19.

In Figs. 11 to 14 are shown four positions which the elements assume in the various steps of moving all of the trays along their respective channels. The channels 26 to 35 act as horizontal conveyors which are superimposed. At one end of the channels 26 to 35 is a vertically slidable first carrier 37 guided by the bars 37–A (Fig. 10) while at the other end is a second carrier 38 vertically slidable in the guide bars 38–A in Fig. 10.

In the carrier 37 is a horizontal slide 39 having pushers 40 to 41 slidable in the slots 50 to 51 which register with even numbered channels when said carrier 37 is raised as shown in Fig. 11 or to register with the odd numbered channels when the carrier 37 is lowered as shown in Fig. 12. The carrier 37 has a vertical slot 42 formed therein.

In the carrier 38 is a horizontal slide 43 having the pushers 44 to 45 slidable in grooves 52 to 53 which register with the even numbered channels 26 to 34 when the carrier 38 is raised as in Fig. 11 or with the odd numbered channels 27 to 35 when the carrier 38 is lowered as in Fig. 12. The carrier 38 has a vertical slot 46 formed therein.

Between the carriers 37 and 38 is a third carrier 47 which is vertically mounted between the guides 48. The carrier 47 has formed therein channels 49 which register with the even numbered channels 28 to 34 when carrier 47 is lowered as in Figs. 11 and 14 or with the odd numbered channels 27 to 33 when raised as in Figs. 12 and 13.

The carrier 37 is connected to a fixed support by a pair of toggle links 54 to a fixed support 55. The carrier 38 is connected by a pair of toggle links 56 to a fixed support 57.

The carrier 47 is connected by the toggle links 58 to the fixed support 59.

Forming a part of the frame structure of the machine are the upright posts 60 on which are secured the bearings 61 in which journals a disk driving shaft 62 on which are secured the two disks 63 one on each side of the machine. On opposite sides of each disk are mounted the rolls 64 and 65.

To the yoke 66 is connected the elevator rod 72 having transverse slots 73, 74 and 75 formed therein, which slots engage pins 76, 77 and 78 of the toggle links 54, 56 and 58.

Movement of the yoke 66 by disk 63 causes the carriers 37 and 38 to move vertically in a direction opposite to that of the carrier 47.

Movement of the yoke 79, due to rotation of the disk 63, causes the conveyor bar 80 to reciprocate somewhat intermittently or with a rest between its reversals of movement. Guide straps 81 and 82 are provided for the bars 80 and 72.

The yokes 66 and 79 slide in the channel guides 83 mounted on the brackets 84 secured to the horizontal bars 85 and 85–A.

Motion is supplied to the shaft 62 through a chain 86, in Fig. 11, from a reduction gear 87 to which power is supplied through a belt 88 from a motor 89. On the shaft 62 is also a chain drive 90 which turns the shaft 91 which journals in the bearings 92 on the frame members 20. On the shaft 91 is a pinion 93 which meshes with an idler 94 which in turn drives a gear 95.

The operation of the device can be best understood from Figs. 11 to 14 in which the travel length is shortened by omitting the intermediate guide channels 28, 29, 30, 31, 32 and 33 and showing the two top and bottom channels 26 and 27, 34 and 35 only.

The trays 36 occupy the channels 26 to 35 at all times, also the carriers 37 and 38 receive trays alternately, while the third carrier 47 receives trays 36 at all times and constitutes the means of raising the trays toward the unloading station.

It will be noted in Figs. 11 to 14 the trays 36 move to the left in the even numbered channels 26 and 34 and to the right in the odd numbered channels 27 and 35.

Assuming that all guide channels are completely filled with trays 36, then as each tray 36 comes to rest at the loading station 96 the doughnuts 36–A are deposited upon the tray as indicated in Fig. 11 which shows the positions of parts at beginning of the rest period of the trays 36. Then as the disk 63 rotates causing the reciprocating movements of the rods 72 and 80 the following sequence of events takes place. First the rod 72 moves to the right thus lowering the carriers 37 and 38 while elevating the carrier 47, thus aligning a tray 36–B with the pusher 44 and with other trays occupying the channels 27 as shown in Fig. 12.

Further rotation of the disk 63 causes the rod 80 to reciprocate, thus moving all trays 36 to the right and causing the trays at 36–B and 36–C to enter the channels 52 and 53 as indicated in Fig. 13.

As the disk 63 continues to rotate, the rod 72 moves to the left, Fig. 14, thus raising the carriers 37 and 38 by the operation of the toggle links 54 and 56 while lowering carrier 47 by means of the toggle 58, thus bringing the tray 36–B in alignment with the uppermost channel 26 at which point the tray 36–B is occupying the channel 98—A shown in Figs. 9 and 19. At this time the tray is swung in an arc with sufficient force to throw the proofed doughnuts 36–A into the cooking device (not shown), after which the tray is returned to its position at 36–B in Fig. 14 and is again in alignment with the channel 26.

Further rotation of disk 63 will now move the rod 80 to the left, thus bringing the empty tray 36–B into channel 26 and the tray 36–C in Fig. 14 will now occupy the carrier 47 and the tray 36 will be moved to the left and the following tray will then be loaded and a new cycle begun.

The travel path of the trays 36 is shown by the dotted line 97 in Fig. 11.

In Fig. 9 there is shown one form of unloader.

In Fig. 19 is shown a perspective view of the unloader element 98 provided with an arm 99 at one end and an arm 100 at the other end, each arm 99 and 100 is provided with a hub 101 through which extends the cross shaft 102. The arm 99 is provided with notches 103 and 104 adjacent its hub 101, and a pin 105. The pin 106 is secured to the arm 100.

Referring to Fig. 9 it will be noted that the channel 98–A is aligned with the channel 52 of carrier 38. The unloader element 98 with its shaft 102 is supported by the arms 121 on carrier 38 (Fig. 16). Latch 107 normally engages notch 103 on arm 99 to prevent unloading movement. The relation of parts in Fig. 9 is just as the unloader 98 is starting to function. Nuts on the lower end of latch rod 107 are adjusted to disengage the latch rod 107 from the notch 103 by movement of carrier 38 when it reaches its upper position. Spring 110 is compressed by the upward movement of carrier 38. As shown in Fig. 9, the latch 107 is just out of the notch 103 and the holding latch 108 is free of its notch 104, thus the pawl 109 will move rapidly downward under action of the compression spring 110. The pawl 109 is in contact with the pin 105 thus causing the unloader 98 to swing about the shaft 102 and the doughnuts will be thrown as previously described into the cooking vat (not shown).

On the opposite end of shaft 102 is secured an arm 111. An inclined toggle joint 112 has a lower end connected to the machine frame and an upper end connected to a pawl 113, normally holding the latter pressed against hub 101 and disposed at an angle to prevent downward movement of the pawl. In the unloading movement, arm 111 strikes the underside of toggle 12 breaking the joint and withdrawing pawl 113 from hub 101. At the same time pin 106 rotates up under the hook of pawl 113 whereby the force of compression spring 114 is applied downwardly through the pawl to pin 106 to reverse the unloading movement of unloader 98 and return the unloader to the position shown in Fig. 9. The pawls 109 and 113 remain down and the springs 110 and 114 are relaxed, thus the holding latch 108 is pushed into the notch 104 under action of its compression spring 115 and thus holds the unloader 98 firmly to maintain the channels 98–A aligned with the channel 52 during the sequence described for Figs. 11 to 14.

When the carrier 38 is lowered all the above described parts are reset, latch 108 being disengaged from notch 104 by engagement of arm 99 with the latch 108. Upon again raising the carrier 38 the springs 110 and 114 are put under stress by contact with the fixed reaction members 116 and 117.

The tray 36 does not leave the unloader 98 during the unloading operation, being frictionally held by leaf springs 118. These springs are placed at strategic points to prevent the trays being shaken out of position, these springs are illustrated in the Figs. 7 and 8.

The construction of pusher unit 39, as illustrated in

Fig. 15, is the same as the pusher unit 43. As shown in Fig. 4, the side rods 80 are connected by cross bars 119 and 120 passing through the slots 42 and 46 of the pusher units 39 and 43.

It will be observed in Figs. 16, 17 and 18 that carriers 37 and 38 contain half as many tray supporting decks, exemplified by channels 50 to 53, as the main frame in Fig. 10. Carrier 47 has one less than half as many deck channels as the main frame. The number of decks in the main frame is not critical except that it must be an even number and not an odd number.

I claim:

1. A doughnut proofing machine comprised of an elongated frame having super-imposed horizontal guide channels therein, elongated work-holding trays arranged to slide in said channels, a set of pusher bars engaging alternate rows of trays adapted to move alternate rows of trays in the same direction, a second set of pusher bars arranged to move the intermediate rows of trays in the opposite direction, a carrier for each set of pusher bars for shifting their registration between the odd and even numbered guide channels, a third carrier disposed between said first and second carriers constituting an elevator for moving said trays in an upward direction, and means for picking up each tray out of line as it returns to a topmost position, inverting said tray and then restoring it to its line of travel.

2. A doughnut proofing machine having in combination a pair of spaced side frames, each side frame having on its inner side super-imposed horizontal guide channels, work-holding trays slidably disposed in said channels, the odd numbered channels being used for tray movement in one direction and the even numbered channels being used for tray movement in the opposite direction, a first carrier vertically slidable at one end of said guide channels, a second vertical carrier disposed at the opposite end of said guide channels, each of said first and second carriers having a slide horizontally mounted therein, each slide having a set of pushers thereon spaced to engage either odd numbered trays or even numbered trays, intermittent means for vertically moving said carriers, conveyor bars for moving said horizontal slides laterally, a cam for actuating said conveyor bar, an elevator at one end of said trays capable of handling one group of trays and moving it upwardly from one tier of trays to the next until the topmost tier is reached, and cam means for actuating said elevator in harmony with said carrier.

References Cited in the file of this patent

UNITED STATES PATENTS

| | | |
|---|---|---|
| 1,577,589 | Rapp | Mar. 23, 1926 |
| 1,881,063 | Randolph | Oct. 4, 1932 |
| 2,599,605 | Bower | June 10, 1952 |
| 2,652,938 | Murphy | Sept. 22, 1953 |
| 2,711,616 | Weller et al. | June 28, 1955 |